(12) United States Patent
Chaudhry et al.

(10) Patent No.: US 7,216,202 B1
(45) Date of Patent: May 8, 2007

(54) METHOD AND APPARATUS FOR SUPPORTING ONE OR MORE SERVERS ON A SINGLE SEMICONDUCTOR CHIP

(75) Inventors: Shailender Chaudhry, San Francisco, CA (US); Marc Tremblay, Menlo Park, CA (US); Quinn A. Jacobson, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 372 days.

(21) Appl. No.: 10/787,386

(22) Filed: Feb. 24, 2004

Related U.S. Application Data

(63) Continuation-in-part of application No. 10/439,911, filed on May 16, 2003, now Pat. No. 6,862,664.

(60) Provisional application No. 60/449,956, filed on Feb. 25, 2003.

(51) Int. Cl.
G06F 12/10 (2006.01)

(52) U.S. Cl. .................. 711/122; 711/137; 711/117; 711/5; 711/119; 711/122; 711/141; 711/142; 711/143; 711/144; 711/163

(58) Field of Classification Search .................. None
See application file for complete search history.

(56) References Cited

U.S. PATENT DOCUMENTS

| | | | | |
|---|---|---|---|---|
| 5,237,694 A | * | 8/1993 | Horne et al. ............... | 710/200 |
| 5,623,628 A | * | 4/1997 | Brayton et al. ............ | 711/141 |
| 6,460,124 B1 | | 10/2002 | Kagi et al. ................. | 711/163 |
| 2002/0083274 A1 | * | 6/2002 | Gharachorloo et al. ..... | 711/144 |
| 2002/0087810 A1 | | 7/2002 | Boatright et al. .......... | 711/145 |
| 2003/0079094 A1 | | 4/2003 | Rajwar et al. ............. | 711/150 |
| 2004/0162967 A1 | | 8/2004 | Tremblay et al. .......... | 712/228 |
| 2004/0187123 A1 | | 9/2004 | Tremblay et al. .......... | 718/100 |

(Continued)

FOREIGN PATENT DOCUMENTS

WO WO 01 93028 A2 12/2001

(Continued)

OTHER PUBLICATIONS

Publication: "Speculative Lock Elison: Enabling High Concurrent Multithreaded Execution" by Rajwar R. et al. Proceedings of the 34th Annual ACM/IEEE International Symposium on Microarchitecture, Austin TX, Dec. 1-5, 2001, International Symposium on Microarchitecture, Los Alamitos, CA: IEEE Comp. Soc, US, Dec. 1, 2001, pp. 294-305, XP001075852, ISBN: 0-7695-1369-7.

(Continued)

*Primary Examiner*—Mano Padmanabhan
*Assistant Examiner*—Patrick M Moore
(74) *Attorney, Agent, or Firm*—Park Vaughan & Fleming LLP

(57) ABSTRACT

One embodiment of the present invention provides a system that facilitates avoiding locks by speculatively executing critical sections of code. During operation, the system allows a process to speculatively execute a critical section of code within a program without first acquiring a lock associated with the critical section. If the process subsequently completes the critical section without encountering an interfering data access from another process, the system commits changes made during the speculative execution, and resumes normal non-speculative execution of the program past the critical section. Otherwise, if an interfering data access from another process is encountered during execution of the critical section, the system discards changes made during the speculative execution, and attempts to re-execute the critical section.

1 Claim, 5 Drawing Sheets

FOREIGN PATENT DOCUMENTS

WO     WO 03/054693     7/2003

OTHER PUBLICATIONS

Publication: "Improving the Throughput of Synchronization by Insertion of Delays" by Rajwar R. et al. Proceedings of the 6th International Symposium on High-Performance Computer Architecture, Jan. 8-12, 2000, pp. 168-179.

"The Potential for Using Thread-Level Data Speculation to Facilitate Automatic Parallelization", by J. Gregory Steffan et al., 1998, IEEE, pp. 2-13.

"Hybrid Hardware/Software Transactional Memory", by Mark Moir et al., XP-002407376.

"Hybrid Transactional Memory", by Mark Moir, Sun Microsystems, Inc. 2005, XP-002407375.

* cited by examiner

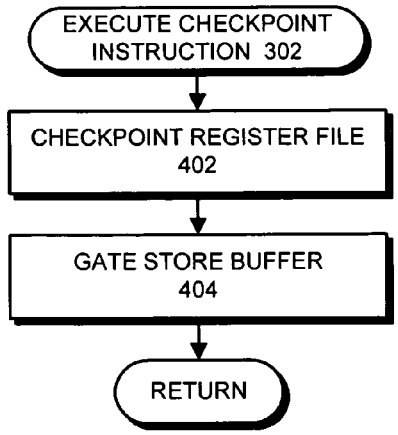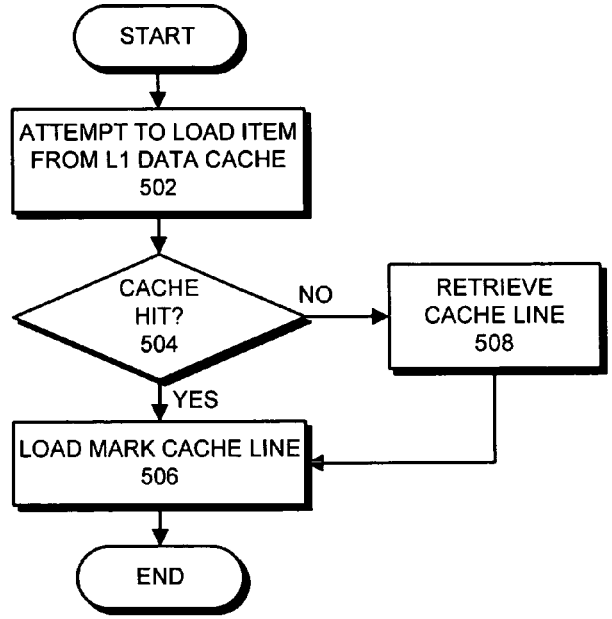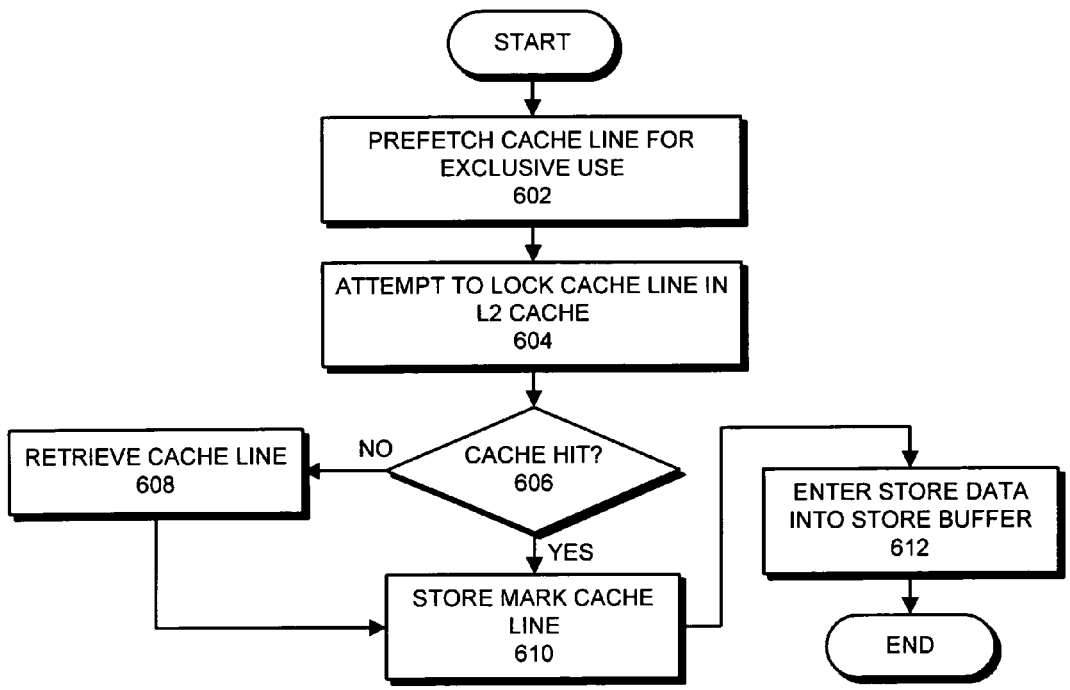
FIG. 4
FIG. 5
FIG. 6

METHOD AND APPARATUS FOR SUPPORTING ONE OR MORE SERVERS ON A SINGLE SEMICONDUCTOR CHIP

RELATED APPLICATIONS

This application is a continuation-in-part of a U.S. patent application, entitled "Method and Apparatus for Avoiding Locks by Speculatively Executing Critical Sections," by inventors Shailender Chaudhry, Marc Tremblay and Quinn Jacobson, Ser. No. 10/439,911, filed 16 May 2003 and now U.S. Pat. No. 6,862,644. This application hereby claims priority under 35 U.S.C. §120 to the above-listed patent application. This application hereby claims priority under 35 U.S.C. §119 to U.S. Provisional Patent Application No. 60/449,956, filed on 25 Feb. 2003, entitled "Method and Apparatus for Supporting One or More Servers on a Single Semiconductor Chip," by inventors Shailender Chaudhry, Marc Tremblay and Quinn Jacobson.

BACKGROUND

1. Field of the Invention

The present invention relates to techniques for improving performance within computer systems. More specifically, the present invention relates to a method and an apparatus for avoiding the overhead involved in using locks by speculatively executing critical sections of code.

2. Related Art

Computer system designers are presently developing mechanisms to support multi-threading within the latest generation of Chip-Multiprocessors (CMPs) as well as more traditional Shared Memory Multiprocessors (SMPs). With proper hardware support, multi-threading can dramatically increase the performance of numerous applications. However, as microprocessor performance continues to increase, the time spent synchronizing between threads (processes) is becoming a large fraction of overall execution time. In fact, as multi-threaded applications begin to use even more threads, this synchronization overhead becomes the dominant factor in limiting application performance.

From a programmer's perspective, synchronization is generally accomplished through the use locks. A lock is typically acquired before a thread enters a critical section of code, and is then released after the thread exits the critical section. If another thread wants to enter the same critical section, it must attempt to acquire the same lock. If it is unable to acquire the lock, because a preceding thread has grabbed the lock, the thread must wait until the preceding thread releases the lock. (Note that a lock can be implemented in a number of ways, such as through atomic operations or semaphores.)

Unfortunately, the process of acquiring a lock and the process of releasing a lock are very time-consuming in modern microprocessors. They involve atomic operations, which typically flush the load buffer and store buffer, and can consequently require hundreds, if not thousands, of processor cycles to complete.

Moreover, as multi-threaded applications use more threads, more locks are required. For example, if multiple threads need to access a shared data structure, it is impractical for performance reasons to use a single lock for the entire data structure. Instead, it is preferable to use multiple fine-grained locks to lock small portions of the data structure. This allows multiple threads to operate on different portions of the data structure in parallel. However, it also requires a single thread to acquire and release multiple locks in order to access different portions of the data structure.

In some cases, locks are used when they are not required. For example, many applications make use of "thread-safe" library routines that use locks to ensure that they are "thread-safe" for multi-threaded applications. Unfortunately, the overhead involved in acquiring and releasing these locks is still incurred, even when the thread-safe library routines are called by a single-threaded application.

Applications typically use locks to ensure mutual exclusion within critical sections of code. However, in many cases threads will not interfere with each other, even if they are allowed to execute a critical section simultaneously. In these cases, mutual exclusion is used to prevent the unlikely case in which threads actually interfere with each other. Hence, in many cases, the overhead involved in acquiring and releasing locks is largely wasted.

As semiconductor integration densities continue to increase, it is becoming possible to integrate the functionality of one or more serves onto a single semiconductor chip. However, a number of problems must be solved in order to achieve this goal. Solving these problems require new features to be integrated into the semiconductor chip. Some of these new features are described below.

What is needed is a method and an apparatus that reduces the overhead involved in manipulating locks when accessing critical sections of code.

SUMMARY

One embodiment of the present invention provides a system that facilitates avoiding locks by speculatively executing critical sections of code. During operation, the system allows a process to speculatively execute a critical section of code within a program without first acquiring a lock associated with the critical section. If the process subsequently completes the critical section without encountering an interfering data access from another process, the system commits changes made during the speculative execution, and resumes normal non-speculative execution of the program past the critical section. Otherwise, if an interfering data access from another process is encountered during execution of the critical section, the system discards changes made during the speculative execution, and attempts to re-execute the critical section.

In a variation on this embodiment, data accesses from other processes are allowed to proceed during the speculative execution of the critical section.

In a variation on this embodiment, attempting to re-execute the critical section involves speculatively re-executing the critical section.

In a variation on this embodiment, if the critical section is not successfully completed after a number of speculative attempts, the system acquires a lock associated with the critical section, and then non-speculatively executes the critical section. The system then releases the lock.

In a variation on this embodiment, prior to allowing the process to speculatively execute the critical section, the system performs a checkpointing operation to checkpoint register values and other state information associated with the process.

In a variation on this embodiment, upon executing a load operation during speculative execution of the critical section, the system "load marks" a corresponding cache line. Note that the corresponding cache line can be load marked in level 1 (L1) cache.

In a variation on this embodiment, upon executing a store operation during speculative execution of the critical section, the system prefetches the corresponding cache line for exclusive use, and also "store marks" the corresponding cache line. Note that the corresponding cache line can be store marked in the cache level closest to the processor where cache lines are coherent.

In a variation on this embodiment, the interfering data access can include: a store by another process to a cache line that has been load marked by the process; and a load or a store by another process to a cache line that has been store marked by the process.

In a variation on this embodiment, while committing changes made during speculative execution, the system clears load marks from cache lines and commits register file changes made during speculative execution. The system also treats store-marked cache lines as locked, thereby causing other processes to wait to access the store-marked cache lines. The system then commits store buffer entries generated during the speculative execution to memory, wherein committing each store buffer entry involves unmarking, and thereby unlocking, a corresponding cache line.

In a variation on this embodiment, while discarding changes made during the speculative execution, the system discards register file changes made during the speculative execution and clears load marks from cache lines. The system also drains store buffer entries generated during the speculative execution, and clears store marks from cache lines.

BRIEF DESCRIPTION OF THE FIGURES

FIG. 4 presents a flow chart illustrating a checkpointing operation in accordance with an embodiment of the present invention.

FIG. 5 presents a flow chart illustrating how load marking is performed during speculative execution in accordance with an embodiment of the present invention.

FIG. 6 presents a flow chart illustrating how store marking is performed during speculative execution in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Computer System

Figure 1:
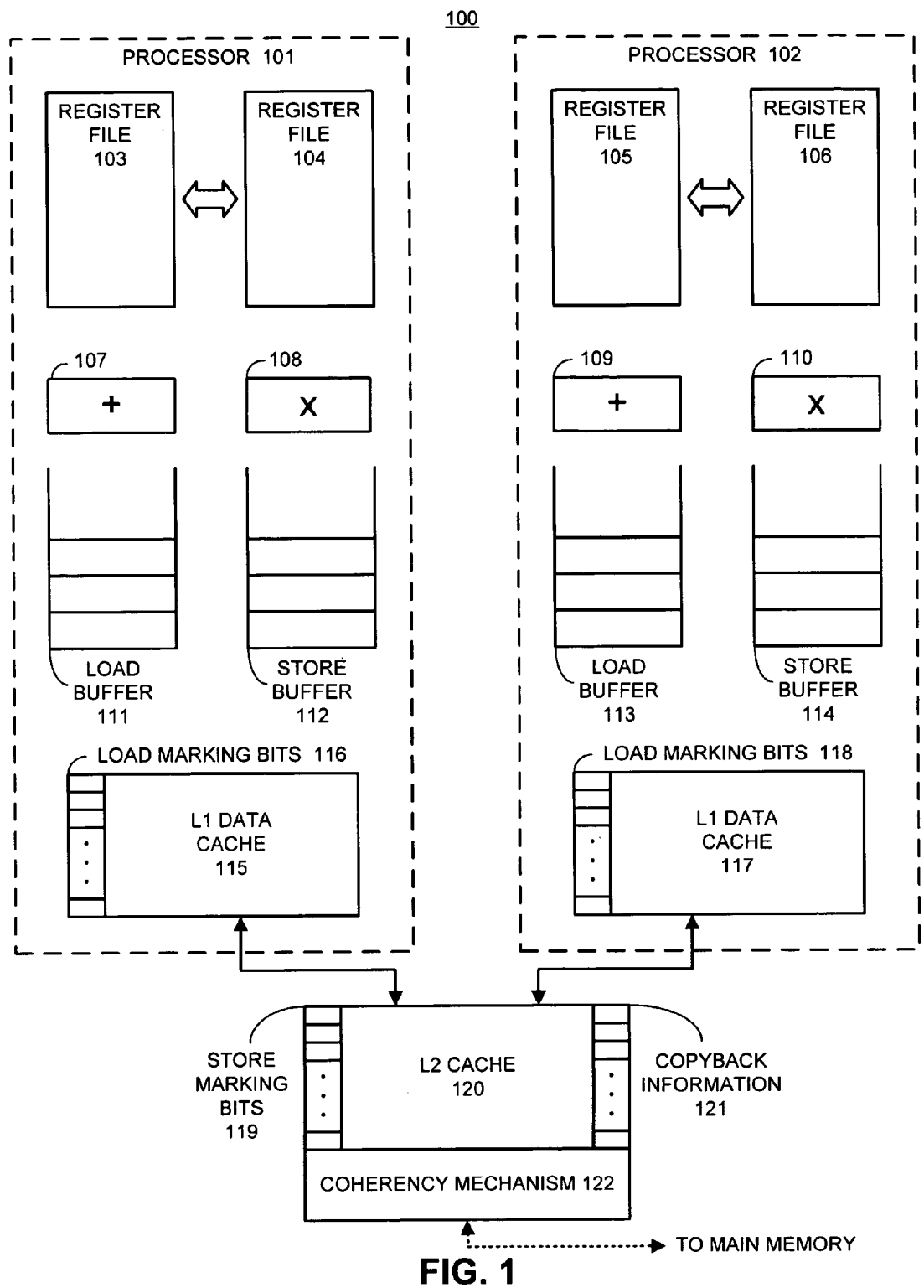
FIG. 1 illustrates a computer system in accordance with an embodiment of the present invention.

FIG. 1 illustrates a computer system 100 in accordance with an embodiment of the present invention. Computer system 100 can generally include any type of computer system, including, but not limited to, a computer system based on a microprocessor, a mainframe computer, a digital signal processor, a portable computing device, a personal organizer, a device controller, and a computational engine within an appliance. As is illustrated in FIG. 1, computer system 100 includes processors 101 and level 2 (L2) cache 120, which is coupled to main memory (not shown). Processor 102 is similar in structure to processor 101, so only processor 101 is described below.

Processor 101 has two register files 103 and 104, one of which is an "active register file" and the other of which is a backup "shadow register file." In one embodiment of the present invention, processor 101 provides a flash copy operation that instantly copies all of the values from register file 103 into register file 104. This facilitates a rapid register checkpointing operation to support speculative execution.

Processor 101 also includes one or more functional units, such as adder 107 and multiplier 108. These functional units are used in performing computational operations involving operands retrieved from register files 103 or 104. As in a conventional processor, load and store operations pass through load buffer 111 and store buffer 112.

Processor 101 additionally includes a level one (L1) data cache 115, which stores data items that are likely to be used by processor 101. Note that each line in L1 data cache 115 includes a "load marking bit," which indicates that a data value from the line has been loaded during speculative execution. This load marking bit is used to determine whether any interfering memory references take place during speculative execution as is described below with reference to FIGS. 3–8. Processor 101 also includes an L1 instruction cache (not shown).

Note that load marking does not necessarily have to take place in L1 data cache 115. In general load marking can take place at any level cache, such as L2 cache 120. However, for performance reasons, the load marking takes place at the cache level that is closest the processor as possible, which in this case is L1 data cache 115. Otherwise, loads would have to go to L2 cache 120 even on an L1 hit.

L2 cache 120 operates in concert with L1 data cache 115 (and a corresponding L1 instruction cache) in processor 101, and with L1 data cache 117 (and a corresponding L1 instruction cache) in processor 102. Note that L2 cache 120 is associated with a coherency mechanism 122, such as the reverse directory structure described in U.S. patent application Ser. No. 10/186,118, entitled, "Method and Apparatus for Facilitating Speculative Loads in a Multiprocessor System," filed on Jun. 26, 2002, by inventors Shailender Chaudhry and Marc Tremblay (Publication No. U.S.-2002-0199066-A1). This coherency mechanism 122 maintains "copyback information" 121 for each cache line. This copyback information 121 facilitates sending a cache line from L2 cache 120 to a requesting processor in cases where the current version of the cache line must first be retrieved from another processor.

Each line in L2 cache 120 includes a "store marking bit," which indicates that a data value has been stored to the line during speculative execution. This store marking bit is used to determine whether any interfering memory references take place during speculative execution as is described below with reference to FIGS. 3–8. Note that store marking does not necessarily have to take place in L2 cache 120.

Ideally, the store marking takes place in the cache level closest to the processor where cache lines are coherent. For write-through L1 data caches, writes are automatically propagated to L2 cache 120. However, if an L1 data cache is a write-back cache, we perform store marking in the L1 data cache. (Note that the cache coherence protocol ensures that any other processor that subsequently modifies the same cache line will retrieve the cache line from the L1 cache, and will hence become aware of the store mark.)

Executing a Critical Section

Figure 2:
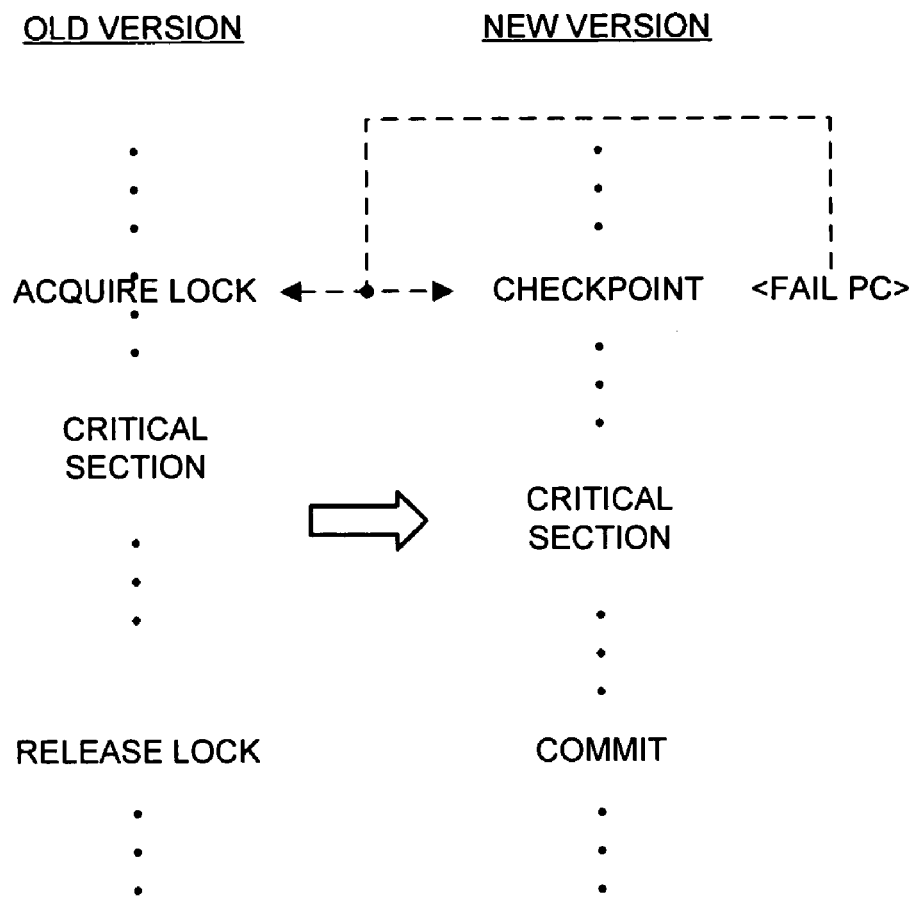
FIG. 2 illustrates how a critical section is executed in accordance with an embodiment of the present invention.

FIG. 2 illustrates how a critical section is executed in accordance with an embodiment of the present invention. As is illustrated in the left-hand side of FIG. 2, a process that executes a critical section typically acquires a lock associated with the critical section before entering the critical section. If the lock has been acquired by another process, the process may have to wait until the other process releases the lock. Upon leaving the critical section, the process releases the lock. (Note that the terms "thread" and "process" are used interchangeably throughout this specification.)

A lock can be associated with a shared data structure. For example, before accessing a shared data structure, a process can acquire a lock on the shared data structure. The process can then execute a critical section of code that accesses the shared data structure. After the process is finished accessing the shared data structure, the process releases the lock.

In contrast, in the present invention, the process does not acquire a lock, but instead executes a checkpoint instruction before entering the critical section. If the critical section is successfully completed without interference from other processes, the process performs a commit operation, to commit changes made during the speculative execution. This sequence of events is described in more detail below with reference to FIGS. 3–8.

Note that in one embodiment of the present invention a compiler replaces lock acquiring instructions with checkpoint instructions, and also replaces a corresponding lock releasing instructions with commit instructions. (Note that there may not be a one-to-one correspondence between replaced instructions. For example, a single lock acquisition operation comprised of multiple instructions may be replaced by a single checkpoint instruction.) The above discussion presumes that the processor's instruction set has been augmented to include a checkpoint instruction and a commit instruction. These instructions are described in more detail below with reference to FIGS. 4 and 7.

Speculative Execution Process

Figure 3:
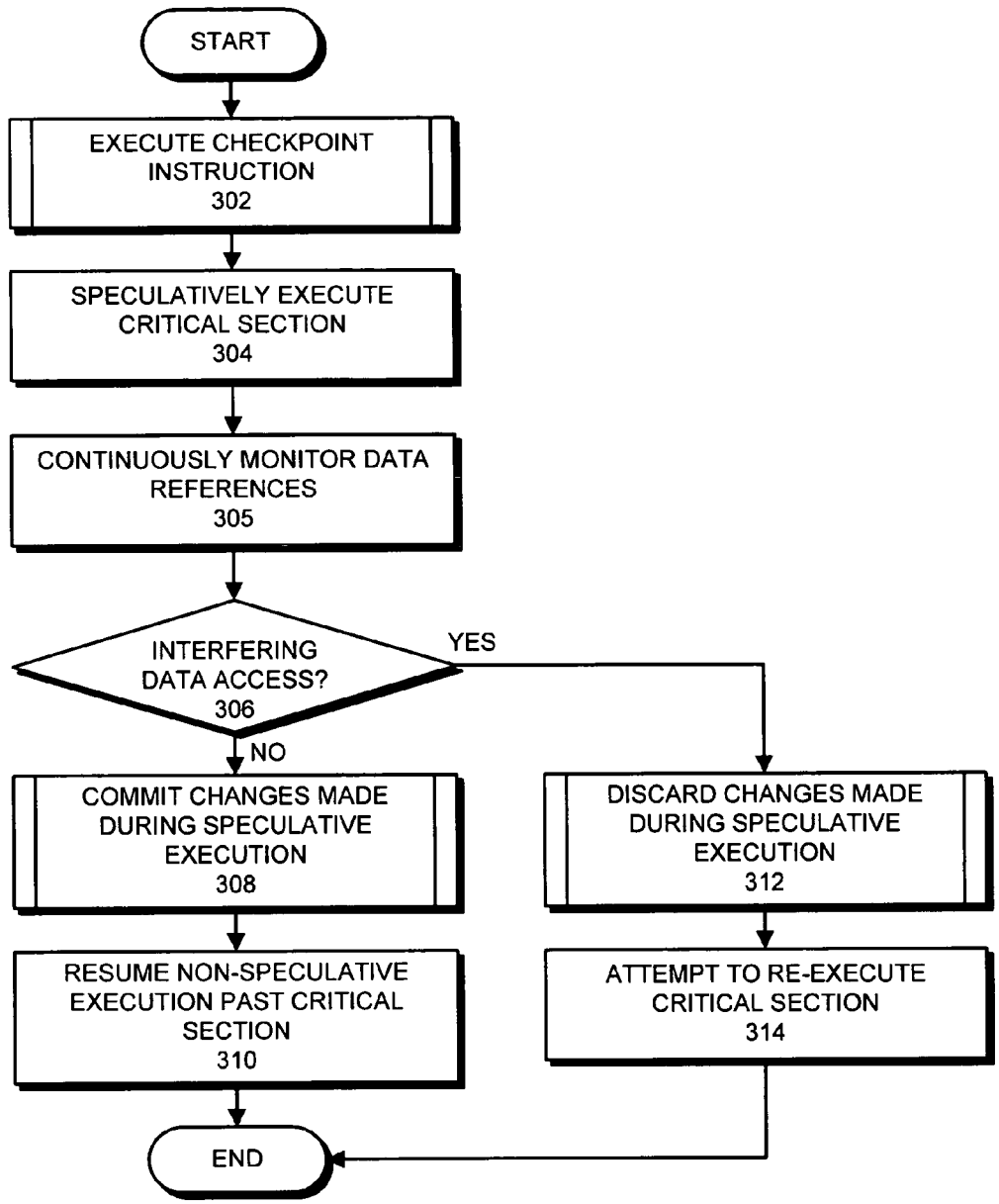
FIG. 3 presents a flow chart illustrating the speculative execution process in accordance with an embodiment of the present invention.

FIG. 3 presents a flow chart illustrating how speculative execution takes place in accordance with an embodiment of the present invention. A process first executes a checkpoint instruction prior to entering of a critical section of code (step 302). Next, the system speculatively executes code within the critical section, without committing results of the speculative execution (step 304).

During this speculative execution, the system continually monitors data references made by other processes (step 305), and determines if an interfering data access takes place during speculative execution (step 306). If not, the system commits changes made during speculative execution (step 308) and then resumes normal non-speculative execution of the program past the critical section (step 310).

On the other hand, if an interfering data access is detected, the system discards changes made during the speculative execution (step 312), and attempts to re-execute the critical section (step 314).

In one embodiment of the present invention, the system attempts the speculatively re-execute the critical section zero, one, two or more times. If these attempts are not successful, the system reverts back to the conventional technique of acquiring a lock on the critical section before entering the critical section, and then releasing the lock after leaving the critical section.

Note that an interfering data access can include a store by another process to a cache line that has been load marked by the process. It can also include a load or a store by another process to a cache line that has been store marked by the process.

Also note that circuitry to detect interfering data accesses can be easily implemented by making minor modifications to conventional cache coherence circuitry. This conventional cache coherence circuitry presently generates signals indicating whether a given cache line has been accessed by another processor. Hence, these signals can be used to determine whether an interfering data access has taken place.

Checkpointing Process

FIG. 4 presents a flow chart illustrating a checkpoint operation in accordance with an embodiment of the present invention. This flow chart illustrates what takes place during step 302 of the flow chart in FIG. 3. The system starts by checkpointing the register file (step 402). This can involve performing a flash copy operation from register file 103 to register file 104 (see FIG. 1). In addition to checkpointing register values, this flash copy can also checkpoint various state registers associated with the currently executing process. In general, the flash copy operation checkpoints enough state to be able to restart the corresponding thread.

The checkpoint operation also causes store buffer 112 to become "gated" (step 404). This allows existing entries in store buffer to propagate to the memory sub-system, but prevents new store buffer entries generated during speculative execution from doing so.

Load Marking Process

FIG. 5 presents a flow chart illustrating how load marking is performed during speculative execution in accordance with an embodiment of the present invention. During speculative execution of a critical section, the system performs a load operation. In performing this load operation, system first attempts to load a data item from L1 data cache 115 (step 502). If the load causes a cache hit, the system "load marks" the corresponding cache line in L1 data cache 115 (step 506). This involves setting the load marking bit for the cache line. Otherwise, if the load causes a cache miss, the system retrieves the cache line from lower levels of the memory hierarchy (step 508), and proceeds to step 506 to load mark the cache line in L1 data cache 115.

Store Marking Process

FIG. 6 presents a flow chart illustrating how store marking is performed during speculative execution in accordance with an embodiment of the present invention. During speculative execution of a critical section, the system performs a store operation. For this store operation, the system first prefetches a corresponding cache line for exclusive use (step 602). Note that this prefetch operation will do nothing if the line is already located in cache and is already in an exclusive use state.

Since in this example L1 data cache 115 is a write-through cache, the store operation propagates through L1 data cache 115 to L2 cache 120. The system then attempts to lock the cache line corresponding to the store operation in L2 data cache 15 (step 604). If the corresponding line is in L2 cache 120 (cache hit), the system "store marks" the corresponding cache line in L2 cache 120 (step 610). This involves setting the store marking bit for the cache line. Otherwise, if the corresponding line is not in L2 cache 120 (cache miss), the system retrieves the cache line from lower levels of the memory hierarchy (step 608) and then proceeds to step 610 to store mark the cache line in L2 cache 120.

Next, after the cache line is store marked in step 610, the system enters the store data into an entry of the store buffer 112 (step 612). Note that this store data will remain in store buffer 112 until a subsequent commit operation takes place, or until changes made during the speculative execution are discarded.

Commit Operation

Figure 7:
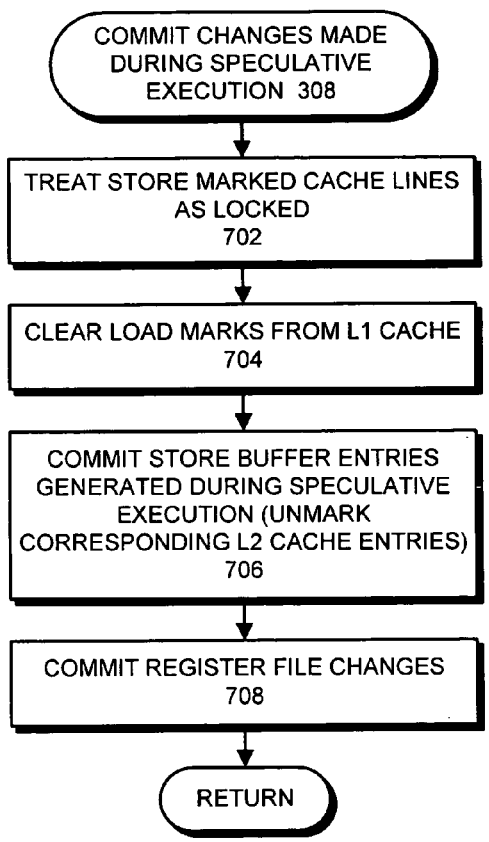
FIG. 7 presents a flow chart illustrating how a commit operation is performed after speculative execution completes successfully in accordance with an embodiment of the present invention.

FIG. 7 presents a flow chart illustrating how a commit operation is performed after speculative execution completes successfully in accordance with an embodiment of the present invention. This flow chart illustrates what takes place during step 308 of the flow chart in FIG. 3.

The system starts by treating store-marked cache lines as though they are locked (step 702). This means other processes that request a store-marked line must wait until the line is no longer locked before they can access the line. This is similar to how lines are locked in conventional caches.

Next, the system clears load marks from L1 data cache 115 (step 704).

The system then commits entries from store buffer 112, which were generated during the speculative execution, into the memory hierarchy (step 706). As each entry is committed, a corresponding line in L2 cache 120 is unmarked.

The system also commits register file changes (step 708). For example, this can involve performing a flash copy between register file 103 and register file 104 in the system illustrated in FIG. 1.

Discarding Changes

Figure 8:
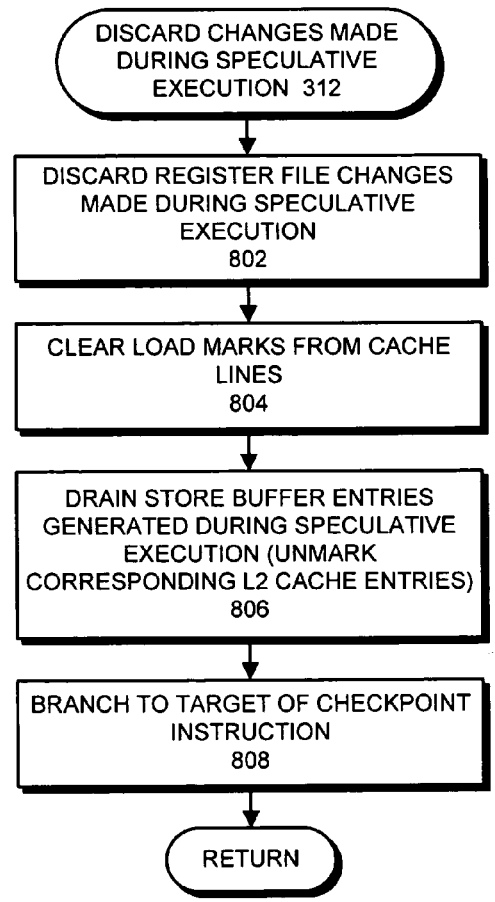
FIG. 8 presents a flow chart illustrating how changes are discarded after speculative execution completes unsuccessfully in accordance with an embodiment of the present invention.

FIG. 8 presents a flow chart illustrating how changes are discarded after speculative execution completes unsuccessfully in accordance with an embodiment of the present invention. This flow chart illustrates what takes place during step 312 of the flow chart in FIG. 3. The system first discards register file changes made during the speculative execution (step 802). This can involve either clearing or simply ignoring register file changes made during speculative execution. This is easy to accomplish because the old register values were checkpointed prior to commencing speculative execution. The system also clears load marks from cache lines in L1 data cache 115 (step 804), and drains store buffer entries generated during speculative execution without committing them to the memory hierarchy (step 806). At the same time, the system unmarks corresponding L2 cache lines. Finally, in one embodiment of the present invention, the system branches to a target location specified by the checkpoint instruction (step 808). The code at this target location attempts to re-execute the critical section as is described above with reference to step 314 of FIG. 1.

Partitioning System Resources Between Different Operating System Domains

In a multiple processor server system, it is desirable to be able to run multiple instances of an operating system at the same time. For example, each instance of the operating system can control a separate "domain," which is made up of one or more processors located on the same chip. (Note that it is also possible for multiple instances of an operating system to run on a single processor.)

In order to accomplish this in the context of a single chip, it is desirable to be able to partition system resources in the chip (such as memory, processors, and I/O devices) so that these resources are allocated to different operating system instances. In doing so, we ensure that operating system instances are protected from each other, and hence, do not interfere with each other while accessing these resources.

Integrating Support Processors into the Server Chip

We will also incorporate special purpose processors, such as DMA controllers, cryptographic processors, and graphics processors onto the same chip as the general-purpose server processors.

Providing the Capability to Enable or Disable Individual Processors on a Chip

As integration densities continue to increase, fabrication errors can cause some of the processors within a semiconductor chip not to work. We can architect the chip so that individual processors can be selectively enabled and disabled. This selective enabling/disabling can be accomplished in a number of ways. It is possible to burn fusible links on the processor chip, or to set configuration registers to enable or disable individual processors or other system components. In this way, the chip can continue to function even when processors or other components on the chip fail to operate.

Multiple-Level Translation Lookaside Buffer (TLB)

Integrating multiple servers on the same chip makes it possible to share frequently accessed state information, such as the contents of a TLB, between multiple processor cores, one can, for example, construct a second-level TLB that sits below first-level TLBs associated with individual processor cores. This second level TLB might store 4K entries, whereas each first-level TLB might store 128 entries. An access to a page table entry in main memory can be stored in the second-level TLB before being forwarded to the first-level TLB associated with the processor that requested the page table entry. This eliminates the need to go all the way back to main memory to access the same page table entry if another processor requests the same page table entry.

High-Speed On-Chip Switch that Allows I/O Devices to Access Coherent Memory

It is possible to construct a cross-bar switch (or some other tyhpe of interconnection network) located on chip that provides high-speed communication between processors, banks of L2 cache, and I/O devices. This switch can be constructed in a way that allows accesses form I/O devices to participate in the cache coherency protocol.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. An apparatus for supporting one or more servers on a single semiconductor chip, comprising:

a plurality of first-level translation lookaside buffers on the single semiconductor chip, wherein each first-level translation lookaside buffer is associated with a processor core of a plurality of processor cores on the single semiconductor chip; and a second-level translation lookaside buffer that is coupled to the plurality of first-level translation lookaside buffers, wherein the second-level translation lookaside buffer stores a subset of the entries in the plurality of first-level translation lookaside buffers;

wherein an access to a page table entry in main memory by a processor core associated with a first-level translation lookaside buffer can be stored in the second-level translation lookaside buffer before being forwarded to the first-level translation buffer associated with the processor that requested the page table entry;

whereby storing the page table entry in the second-level translation lookaside buffer eliminates a need to refer to main memory to access the same page table entry if another processor requests the same page table entry.

* * * * *